United States Patent
Kondo et al.

(10) Patent No.: US 9,707,824 B2
(45) Date of Patent: Jul. 18, 2017

(54) VEHICLE HEAT PUMP AIR-CONDITIONING SYSTEM

(71) Applicant: MITSUBISHI HEAVY INDUSTRIES AUTOMOTIVE THERMAL SYSTEMS CO., LTD, Kiyosu-shi, Aichi (JP)

(72) Inventors: Toshihisa Kondo, Tokyo (JP); Nobuya Nakagawa, Tokyo (JP); Akira Katayama, Tokyo (JP); Futoru Furuta, Tokyo (JP); Masatoshi Morishita, Tokyo (JP); Shinji Deguchi, Nagoya (JP); Yasuo Ishihara, Nagoya (JP)

(73) Assignee: MITSUBISHI HEAVY INDUSTRIES AUTOMOTIVE THERMAL SYSTEMS CO., LTD., Kiyosu-shi (JP)

( * ) Notice: Subject to any disclaimer, the term of this patent is extended or adjusted under 35 U.S.C. 154(b) by 128 days.

(21) Appl. No.: 14/386,178

(22) PCT Filed: Mar. 28, 2013

(86) PCT No.: PCT/JP2013/059372
§ 371 (c)(1),
(2) Date: Sep. 18, 2014

(87) PCT Pub. No.: WO2013/175863
PCT Pub. Date: Nov. 28, 2013

(65) Prior Publication Data
US 2015/0033782 A1  Feb. 5, 2015

(30) Foreign Application Priority Data

May 25, 2012 (JP) .................................. 2012-119708

(51) Int. Cl.
B60H 1/22 (2006.01)
B60H 1/32 (2006.01)
B60H 1/00 (2006.01)

(52) U.S. Cl.
CPC ........... *B60H 1/22* (2013.01); *B60H 1/00385* (2013.01); *B60H 1/00921* (2013.01);
(Continued)

(58) Field of Classification Search
CPC ................... B60H 1/22; B60H 1/2225; B60H 2001/00121; B60H 1/004;
(Continued)

(56) References Cited

U.S. PATENT DOCUMENTS 6,370,903 B1    4/2002  Wlech
2012/0011869 A1*  1/2012  Kondo ................ B60H 1/2225
                                                62/176.5

FOREIGN PATENT DOCUMENTS

CN         102155777 A    8/2011
DE   10 2005 026 677 A1   2/2006
(Continued)

OTHER PUBLICATIONS

Office Action dated Dec. 2, 2015, issued in counterpart Chinese Patent Application No. 201380024708.4, with English translation. (17 pages).

(Continued)

*Primary Examiner* — Cassey D Bauer
(74) *Attorney, Agent, or Firm* — Westerman, Hattori, Daniels & Adrian, LLP

(57) ABSTRACT

A vehicle heat pump air-conditioning system is provided, which is capable of securing a temperature linearity characteristic during dehumidifying heating, slowing progression of a frost formation on an exterior evaporator during heating, and stably continuing a heating operation while (Continued)

suppressing variations in a blowout temperature. In a cooling refrigeration cycle (14) becoming a base, an interior condenser (8) disposed in a HVAC unit (2) is connected to an exterior condenser (10) in parallel via switching means (15), an exterior evaporator (17) is connected to first decompression means (12) and an interior evaporator (7) in parallel via second decompression means (16), a heating heat pump cycle (18) is configured, the first decompression means (12) and the second decompression means (16) are on-off valve function attached decompression means (12, 16), and the exterior evaporator (17) and the interior evaporator (7) can be simultaneously used during dehumidifying heating and heating.

6 Claims, 6 Drawing Sheets

(52) U.S. Cl.
CPC ............. *B60H 1/321* (2013.01); *B60H 1/323* (2013.01); *B60H 1/3204* (2013.01); *B60H 1/3213* (2013.01); *B60H 2001/00942* (2013.01)

(58) Field of Classification Search
CPC .......... B60H 1/00457–1/00471; B60H 1/3227; B60H 1/323; B60H 1/00921; B60H 2001/00949; B60H 2001/3283; F25B 47/02; F25B 2600/2513
See application file for complete search history.

(56) References Cited

FOREIGN PATENT DOCUMENTS

| | | | |
|---|---|---|---|
| JP | 07-009844 | A | 1/1995 |
| JP | 08-282262 | A | 10/1996 |
| JP | 11-170849 | A | 6/1999 |
| JP | 2000-301935 | A | 10/2000 |
| JP | 2004-189213 | A | 7/2004 |
| JP | 2009-074760 | A | 4/2009 |
| JP | 2012-096634 | A | 5/2012 |
| WO | 2011/016264 | A1 | 2/2011 |
| WO | 2012/060132 | A1 | 5/2012 |

OTHER PUBLICATIONS

International Search Report dated Jun. 25, 2013, issued in corresponding application No. PCT/JP2013/059372.

Written Opinion dated Jun. 25, 2013, issued in corresponding application No. PCT/JP2013/059372.

Office Action dated May 23, 2016, issued in counterpart German Patent Application No. 112013002671.6, with English translation. (11 pages).

The Notification on the Grant of a Patent dated Jul. 29, 2016, issued in counterpart Chinese Patent Application No. 201380024708.4, with English translation. An explanation of relevance states "The Notification of the Grant of Patent Right for Invention has been received". (2 pages).

* cited by examiner

VEHICLE HEAT PUMP AIR-CONDITIONING SYSTEM

TECHNICAL FIELD

The present invention relates to a vehicle heat pump air-conditioning system which is applied to air conditioning of an Electric Vehicle (EV) or the like.

BACKGROUND ART

In a vehicle air conditioning system which is used in an Electric Vehicle (EV), a Hybrid Electric Vehicle (HEV), a Plug-in Hybrid Electric Vehicle (PHEV), or the like, a heating operation cannot be performed using combustion exhaust heat of engine cooling water or the like. In addition, exhaust heat from a travelling motor, a battery, or the like can be used instead of an engine. However, an amount of the exhaust heat is small, and thus, a heating system which has only the exhaust heat as a heat source cannot be realized. Meanwhile, a heating system using an electric heater is considered. However, since heating power consumption is increased with respect to battery capacity, there is a problem that a travel distance of a vehicle is significantly decreased due to use of the heating.

Accordingly, as the vehicle air conditioning system which is applied to the EV or the like, a heat pump type air conditioning system using an electric compressor is considered. In a case of a reverse type heat pump, pipes configuring a refrigerant circuit, a heat exchanger such as an evaporator or a condenser, or the like should be used in common under different pressure conditions of a cooling operation and a heating operation. Accordingly, a vehicle air conditioning system applied to a current engine drive type vehicle should be changed thoroughly.

Meanwhile, as described in PTL 1, an air conditioning system in which a sub condenser (interior condenser) is added to a refrigerant circuit is suggested. In this case, a heat pump type vehicle air conditioning system can be configured by adding a switching valve, a bypass circuit, and a sub condenser while using the evaporator of a current system with respect to an interior evaporator which is provided in a Heating Ventilation and Air Conditioning Unit (HVAC unit).

CITATION LIST

Patent Literature

[PTL 1] Japanese Unexamined Patent Application Publication No. 11-170849

SUMMARY OF INVENTION

Technical Problem

In the air conditioning system described in PTL 1, a heating heat pump cycle can be configured using a cooling refrigeration cycle of the current system which becomes a base, as it is. However, instead of an air mix type having large reheating loss, when an interior evaporator and an interior condenser are simultaneously used, air cooled by the interior evaporator is heated by the interior condenser, and a dehumidifying heating operation is performed, a blowout air temperature cannot be changed even when a refrigerant circulation amount is adjusted by changing a revolution speed of an electric compressor. Accordingly, a temperature linearity characteristic (blowout temperature follow-up performance with respect to a set temperature change) cannot be secured. Moreover, frost occurs on an exterior evaporator under a frost formation condition during heating, and thus, there is a problem that a heating operation cannot be stably continued or the like.

The present invention is made in consideration of the above-described circumstances, and an object thereof is to provide a vehicle heat pump air-conditioning system which is capable of using a cooling refrigeration cycle of a current system as it is, securing a temperature linearity characteristic during dehumidifying heating, slowing progression of a frost formation on an exterior evaporator during heating, and stably continuing a heating operation while suppressing variations in a blowout temperature.

Solution to Problem

According to a first aspect of the present invention, there is provided a vehicle heat pump air-conditioning system including: a cooling refrigeration cycle in which an electric compressor, an exterior condenser, a receiver, first decompression means, and an interior evaporator provided in a HVAC unit are connected to one another in this order; an interior condenser which is disposed at the downstream side of the interior evaporator in the HVAC unit and in which a refrigerant inlet side is connected to a discharge circuit of the electric compressor via switching means and a refrigerant outlet side is connected to the receiver; and an exterior evaporator in which a refrigerant inlet side is connected to an outlet side of the receiver via second decompression means and a refrigerant outlet side is connected to a suction circuit of the electric compressor, in which the electric compressor, the switching means, the interior condenser, the receiver, the second decompression means, and the exterior evaporator are connected to one another in this order, and a heating heat pump cycle is configured, and the first decompression means and the second decompression means is configured of on-off valve function attached decompression means, and the exterior evaporator and the interior evaporator can be simultaneously used during dehumidifying heating and heating.

According to the first aspect, the heating heat pump cycle is configured so that the interior condenser disposed in the HVAC unit with respect to the cooling refrigeration cycle becoming a base is connected to the exterior condenser in parallel via the switching means and the exterior evaporator is connected to the first decompression means and the interior evaporator in parallel via the second decompression means, the first decompression means and the second decompression means are the on-off valve function attached decompression means, and thus, during the dehumidifying heating and the heating, the exterior evaporator and the interior evaporator can be simultaneously used. Accordingly, the heating heat pump cycle can be configured while using the cooling refrigeration cycle including the interior evaporator of a current system as it is. During the dehumidifying heating using the heating heat pump cycle, the refrigerant circulates through the electric compressor, the switching means, the interior condenser, the receiver, the second decompression means, and the exterior evaporator in this order, the on-off valve function of the first decompression means is opened, a portion of the refrigerant flows to the interior evaporator, the amount of the refrigerant to the interior evaporator is adjusted by the first decompression means, and thus, the revolution speed of the electric compressor is changed and a refrigerant circulation flow rate is adjusted. Accordingly, the temperature of the air, which passes through the interior condenser and is blown to the vehicle interior, is changed, and a temperature linearity characteristic (blowout air temperature follow-up performance with respect to a set temperature change) can be secured. Moreover, during heating, under a frost formation condition to the exterior evaporator, the on-off valve function of the first decompression means is opened, a portion of the refrigerant circulates to the interior evaporator side via the first decompression means, the amount of the refrigerant to the exterior evaporator is adjusted, and thus, progression of the frost formation is slowed, and it is possible to stably continue the heating operation while suppressing the variation of the blowout air temperature. Accordingly, it is possible to improve heating performance in the heat pump type vehicle air conditioning system.

According to a second aspect of the present invention, in the vehicle heat pump air-conditioning system of the first aspect, the first decompression means and the second decompression means may be an electromagnetic valve attached temperature type automatic expansion valve or an electromagnetic expansion valve.

According to the second aspect, the first decompression means and the second decompression means are the electromagnetic valve attached temperature type automatic expansion valve or the electromagnetic expansion valve. Accordingly, when the electromagnetic valve attached temperature type automatic expansion valve is used for the first decompression means and the second decompression means, the refrigerant can be circulated or blocked by opening and closing of the electromagnetic valve. When the electromagnetic valve is opened, the refrigerant flow rate can be automatically controlled by the temperature type automatic expansion valve so that a superheating degree of the refrigerant is constant at the outlet of the exterior evaporator or the interior evaporator. Moreover, when the electromagnetic expansion valve is used, the refrigerant can be circulated or blocked by fully closing and fully opening functions of the electromagnetic expansion valve, and the superheating degree of the refrigerant in the outlet of the exterior evaporator or the interior evaporator can be controlled by the opening degree adjustment function. Therefore, according to an operation mode, the first decompression means and the second decompression means can be used so as to be switched by using the on-off valve function, and during the dehumidifying heating and the heating, an operation, in which the exterior evaporator and the interior evaporator are simultaneously used, can be performed. In addition, the electromagnetic valve attached temperature type automatic expansion valve of the present invention includes not only a configuration in which the electromagnetic valve and the temperature type automatic expansion valve are integrated with each other but also a configuration in which independently individual electromagnetic valve and temperature type automatic expansion valve are connected to each other in series. In the present invention, the decompression means, to which the electromagnetic expansion valve having the above-described functions is added, is referred to as on-off valve function attached decompression means.

According to a third aspect of the present invention, in the vehicle heat pump air-conditioning system of the first or second aspect, the receiver may be a check valve attached receiver in which each check valve is incorporated to a refrigerant inflow port of a refrigerant circuit from the exterior condenser and the interior condenser connected to the receiver.

According to the third aspect, the receiver is the check valve attached receiver in which each check valve is incorporated to the refrigerant inflow port of the refrigerant circuit from the exterior condenser and the interior condenser connected to the receiver. Accordingly, the cooling or heating refrigerant circuit not used by the operation mode can be blocked by the check valve incorporated to the refrigerant inflow port of the receiver. Accordingly, collection of the refrigerant to the unused circuit can be prevented, and compared to a system in which the receiver and the check valve are provided in the refrigerant circuit individually, connection parts such as a flange can be decreased, the refrigerant circuit can be simplified, and the cost can be decreased.

According to a fourth aspect of the present invention, in the vehicle heat pump air-conditioning system according to any one of the first to third aspects, the exterior condenser, the exterior evaporator, and a radiator which radiates exhaust heat of a motor, an inverter, a battery, or the like mounted on a vehicle may be provided in a ventilation path of a single fan, and the exterior evaporator may be disposed at the rear stream sides of the exterior condenser and the radiator in the ventilation path.

According to the fourth aspect, the exterior condenser, the exterior evaporator, and the radiator which radiates the exhaust heat of the motor, the inverter, the battery, or the like mounted on the vehicle side are provided in the ventilation path of the single fan, and the exterior evaporator is disposed at the rear stream sides of the exterior condenser and the radiator in the ventilation path. Accordingly, the ventilation to the exterior condenser used during the cooling, and the ventilation to the exterior evaporator and the ventilation to the radiator used during the heating can be performed by the single fan, and the outside air ventilating the exterior condenser and the radiator can ventilate the exterior evaporator used during the heating. Accordingly, the number of installed fans is decreased, and thus, the system configuration can be simplified, and the cost can be decreased. Moreover, frost cannot be easily formed on the exterior evaporator during the heating, the exterior evaporator absorbs the heat radiated from the radiator, the heat is effectively used for the heating, and thus, heating capability can be improved.

According to a fifth aspect of the present invention, in the vehicle heat pump air-conditioning system according to the fourth aspect, the exterior condenser and the radiator may be vertically disposed, and the exterior evaporator may be disposed at the rear stream sides of the exterior condenser and the radiator.

According to the fifth aspect, the exterior condenser and the radiator are vertically disposed, and the exterior evaporator is disposed at the rear stream sides of the exterior condenser and the radiator. Accordingly, compared to a module having a configuration in which the exterior condenser, the radiator, the exterior evaporator, and the fan are disposed along a ventilation direction, the size in the ventilation direction can be decreased. Accordingly, the size in the module can be decreased, the cost can be decreased, a degree of freedom in the design can be increased, and mountability to a vehicle can be improved.

According to a sixth aspect of the present invention, in the vehicle heat pump air-conditioning system according to any one of the first to fifth aspects, according to a blowout air temperature from the interior evaporator or a fin temperature during a dehumidifying heating operation, when the blowout air temperature from the interior evaporator or the fin temperature is equal to or more than a set temperature, a portion of the refrigerant may be divided and may flow to the interior evaporator via the first decompression means, and when the blowout air temperature from the interior evaporator or the fin temperature is less than or equal to a set value, the divided flow of the refrigerant to the interior condenser may be stopped via the first decompression means.

According to the sixth aspect, according to the blowout air temperature from the interior evaporator or the fin temperature during the dehumidifying heating operation, when the blowout air temperature from the interior evaporator or the fin temperature is equal to or more than the set temperature, a portion of the refrigerant is divided and flows to the interior evaporator via the first decompression means, and when the blowout air temperature from the interior evaporator or the fin temperature is less than or equal to a set value, the divided flow of the refrigerant to the interior condenser is stopped via the first decompression means. Accordingly, when the dehumidifying heating is performed by heating the air, which is cooled and dehumidified by the interior evaporator using the interior condenser disposed at the downstream side, even though a revolution speed of the electric compressor is changed and a refrigerant circulation flow rate is adjusted, a temperature linearity characteristic cannot be secured by only heating and blowing the air, which is cooled by the interior evaporator, using the interior condenser as it is. However, when the blowout air temperature from the interior evaporator or the fin temperature is equal to or more than the set temperature, a portion of the refrigerant is divided and flows to the interior evaporator via the first decompression means, when the blowout air temperature or the fin temperature is less than or equal to the set value, the divided flow of the refrigerant to the interior evaporator via the first decompression means is stopped, a cooling amount by the interior evaporator is decreased, and thus, the blowout air temperature can be changed by adjustment of a refrigerant circulation flow rate according to the change of the revolution speed of the electric compressor. Accordingly, the temperature linearity characteristic can be secured even during the dehumidifying heating.

According to a seventh aspect of the present invention, in the vehicle heat pump air-conditioning system according to any one of the first to fifth aspects, during a heating operation, when an outlet refrigerant temperature of the exterior evaporator is less than or equal to a set value, a portion of the refrigerant may be divided and may flow to the interior evaporator via the first decompression means, and when a blowout air temperature from the interior evaporator or a fin temperature is less than or equal to the set value, the divided flow of the refrigerant to the interior evaporator via the first decompression means may be stopped.

According to the seventh aspect, during a heating operation, when the outlet refrigerant temperature of the exterior evaporator is less than or equal to a set value, a portion of the refrigerant is divided and flows to the interior evaporator via the first decompression means, and when the blowout air temperature from the interior evaporator or the fin temperature is less than or equal to the set value, the divided flow of the refrigerant to the interior evaporator via the first decompression means is stopped. Accordingly, when the outlet refrigerant temperature of the exterior evaporator is less than or equal to the set value under a frost formation condition with respect to the exterior evaporator during the heating, a portion of the refrigerant is divided and flows to the interior evaporator via the first decompression means, the operation is performed so that the exterior evaporator and the interior evaporator are simultaneously used, and thus, progression of the frost formation on the exterior evaporator can be slowed. Moreover, the blowout air temperature from the interior evaporator or the fin temperature is less than or equal to the set value, the divided flow of the refrigerant to the interior evaporator via the first decompression means is stopped, a decrease in the blowout air temperature to the vehicle interior is suppressed, and the operation can be performed so that a variation width of the air temperature is suppressed so as to be within a predetermined range by repeating this. Accordingly, during the heating, the progression of the frost formation on the exterior evaporator is slowed, and it is possible to stably continue the heating operation while suppressing the variation of the blowout air temperature.

Advantageous Effects of Invention

According to the present invention, a cooling refrigeration cycle including an interior evaporator of a current system is used as it is to configure a heating heat pump cycle, a refrigerant is circulated through an electric compressor, switching means, an interior condenser, a receiver, second decompression means, and an exterior evaporator in this order using the heating heat pump cycle during the dehumidifying heating, an on-off valve function of the first decompression means is opened, a portion of the refrigerant flows to the interior evaporator via the first decompression means, a cooling amount of the interior evaporator is adjusted, a temperature of air which passes through the interior condenser and is blown to a vehicle interior is changed by adjusting a refrigerant circulation flow rate by changing a revolution speed of an electric compressor, and a temperature linearity characteristic (blowout air temperature follow-up performance with respect to a set temperature change) can be secured. Moreover, under the frost formation condition on the exterior evaporator during the heating, the on-off valve function of the first decompression means is opened, and a portion of the refrigerant is circulated to the interior evaporator side via the first decompression means. Accordingly, progression of the frost formation on the exterior evaporator is slowed, it is possible to stably continue the heating operation while suppressing the variation of the blowout air temperature, and thus, heating performance in a heat pump type vehicle air conditioning system can be improved.

DESCRIPTION OF EMBODIMENTS

Hereinafter, an embodiment of the present invention will be described with reference to FIGS. 1 to 6.

Figure 1:
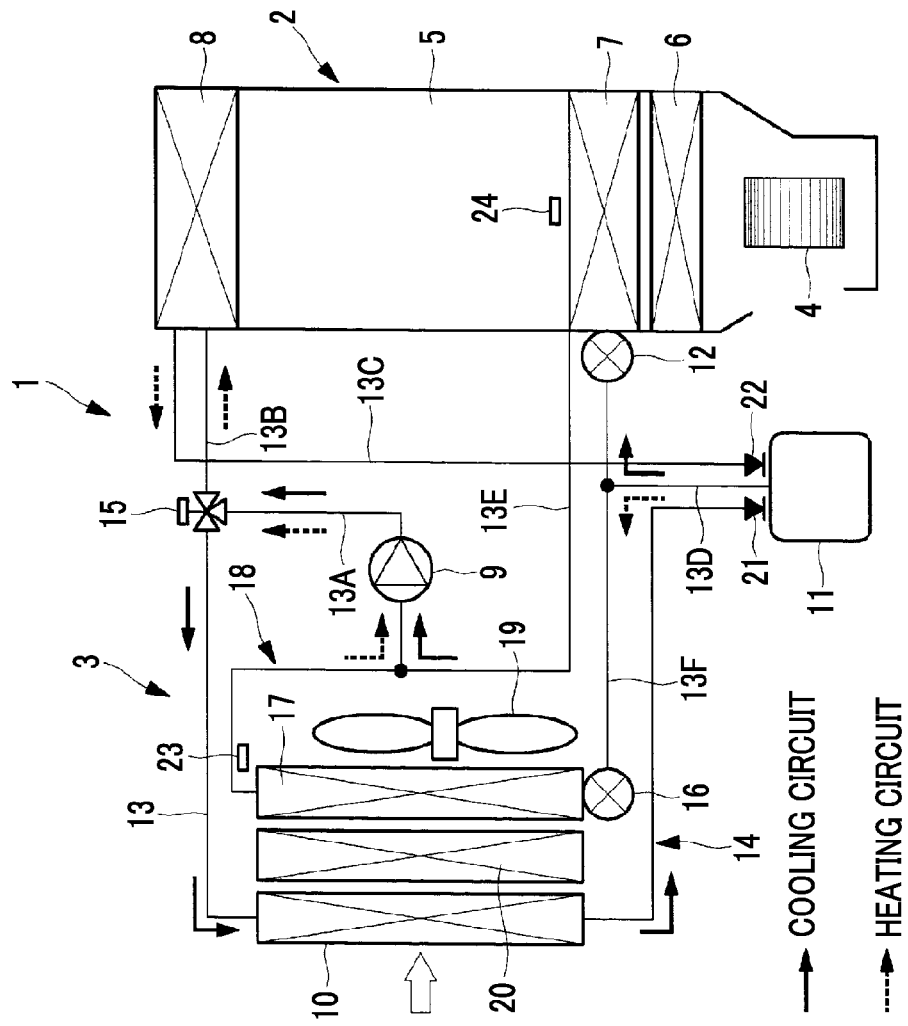
FIG. 1 is a schematic configuration diagram showing a vehicle heat pump air-conditioning system according to an embodiment of the present invention.
Figure 2:
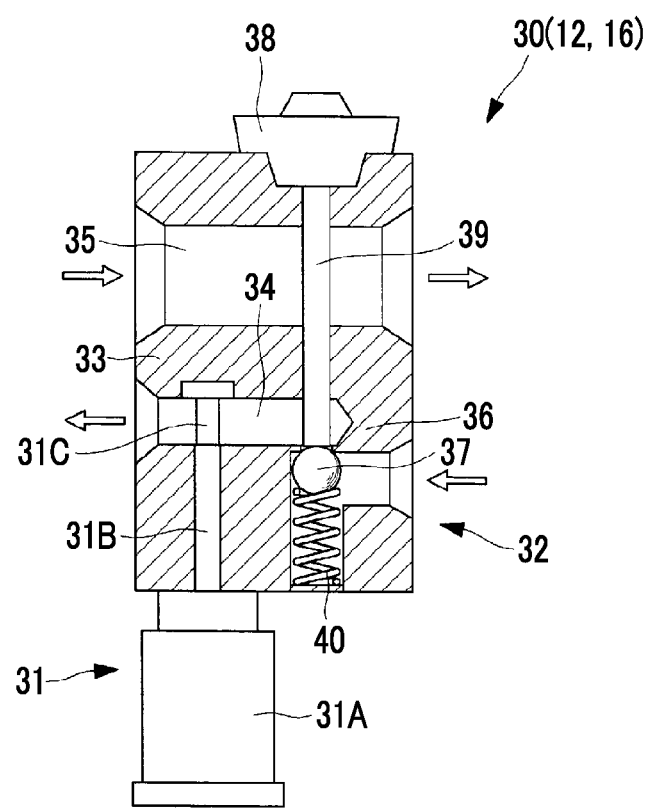
FIG. 2 is a configuration diagram showing an electromagnetic valve attached temperature type automatic expansion valve which is incorporated into the vehicle heat pump air-conditioning system shown in FIG. 1.
Figure 3:
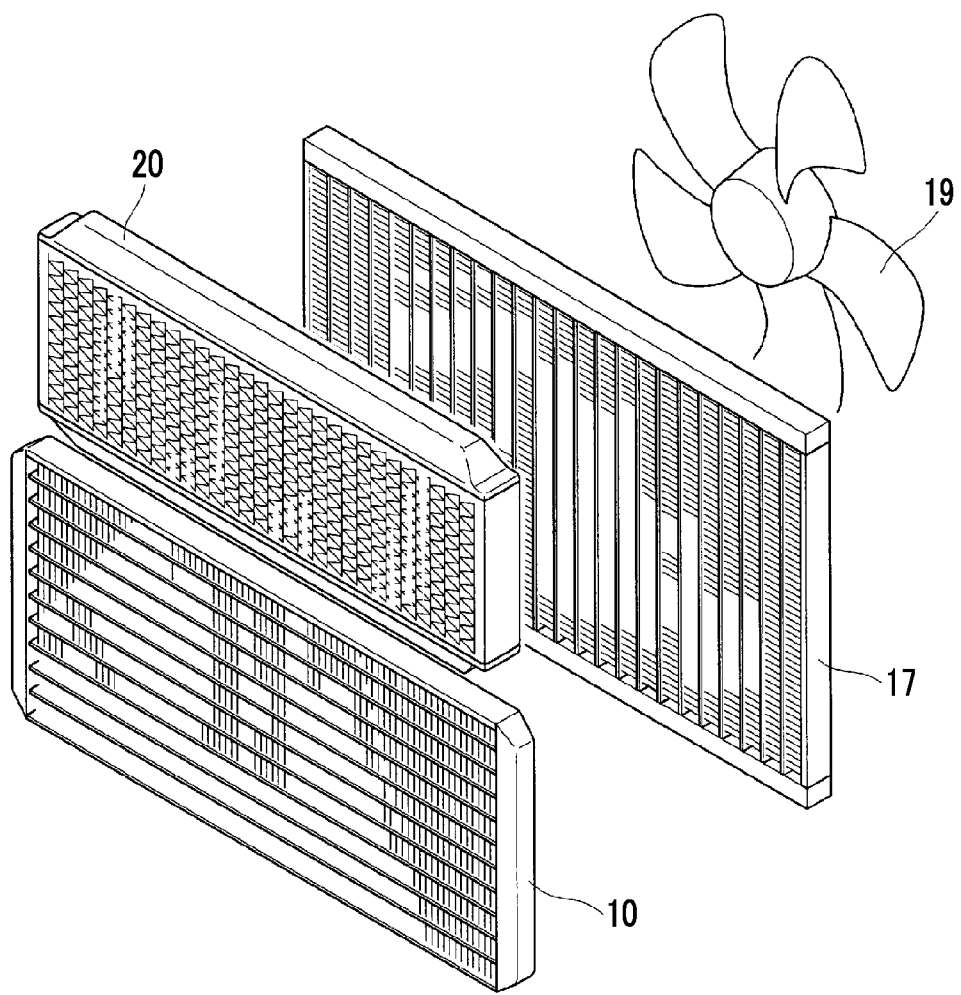
FIG. 3 is a perspective diagram showing a modification of a disposition structure of an exterior condenser, an exterior evaporator, and a radiator which can be adopted to the vehicle heat pump air-conditioning system shown in FIG. 1.

FIG. 1 shows a schematic configuration diagram of a vehicle heat pump air-conditioning system according to an embodiment of the present invention. FIG. 2 shows a configuration diagram of an electromagnetic valve attached temperature type automatic expansion valve which is incorporated into the system. FIG. 3 shows a perspective diagram of a disposition structure of an exterior condenser, an exterior evaporator, and a radiator which can be adopted to the system.

A vehicle heat pump air-conditioning system 1 of the present embodiment includes a Heating Ventilation and Air Conditioning Unit (HVAC unit) 2 and a heat pump cycle 3 which can be operated for heating and cooling.

The HVAC unit 2 includes a blower 4 which switches and introduces either inside air or outside air from a vehicle interior and forcibly feeds the air to the downstream side, and an electric auxiliary heater (for example, a PTC heater) 6, an interior evaporator 7, and an interior condenser 8 which are sequentially disposed from the upstream side to the downstream side in an air passage 5 continuing to the blower 4. Generally, the HVAC unit 2 is disposed in an instrument panel positioned at the front side of the vehicle interior, selectively blows airflow, in which a temperature is adjusted by the electric auxiliary heater 6, the interior evaporator 7, and the interior condenser 8, to the vehicle interior from a plurality of blow-out ports opened toward the vehicle interior, and air-conditions the vehicle interior to a set temperature. Moreover, the electric auxiliary heater 6 may be omitted.

The heat pump cycle 3, which can be operated for heating and cooling, includes a closed cooling refrigeration cycle (cooling circuit) 14 in which an electric compressor 9 compressing a refrigerant, an exterior condenser 10, a receiver 11, on-off valve function attached first decompression means 12, and the interior evaporator 7 are connected to one another via a refrigerant pipe 13 in this order. The cooling refrigeration cycle 14 may be the same as the refrigeration cycle which is used in a current vehicle air conditioning system adopted to an engine drive type vehicle.

Moreover, in the heat pump cycle 3, the interior condenser 8 disposed in the HVAC unit 2 is connected to a discharge pipe (discharge circuit) 13A from the electric compressor 9 via a three-way switching valve (switching means) 15. A refrigerant pipe 13B from the three-way switching valve 15 is connected to a refrigerant inlet, the other end of a refrigerant pipe 13C connected to a refrigerant outlet is connected to the receiver 11, and thus, the interior condenser 8 is connected to the exterior condenser 10 in the refrigeration cycle 14 in parallel to each other.

In addition, a refrigeration pipe 13F including an exterior evaporator 17 is connected between an outlet pipe 13D of the receiver 11 and a suction pipe (suction circuit) 13E to the electric compressor 9 via on-off valve function attached second decompression means 16. The second decompression means 16 and the exterior evaporator 17 are connected to the first decompression means 12 and the interior evaporator 7 in parallel. Accordingly, a closed heating heat pump cycle (heating cycle) 18 can be configured in which the electric compressor 9, the three-way switching valve 15, the interior condenser 8 provided in the HVAC unit 2, the receiver 11, the on-off valve function attached second decompression means 16, and the exterior evaporator 17 are connected to one another in this order via refrigerant pipes 13A, 13B, 13C, 13F, and 13E.

In the heat pump cycle 3, the exterior evaporator 17 configuring the heating heat pump cycle 18 is disposed so as to be parallel with the exterior condenser 10 at the rear stream side of the interior condenser in a ventilation path of a single fan 19 which ventilates the outside air with respect to the exterior condenser 10 configuring the cooling refrigeration cycle 14, and the fan 19 is used in common. In the present system, a radiator 20, which radiates heat generated by a motor, an inverter, a battery, or the like mounted on the vehicle, is disposed between the exterior condenser 10 and the exterior evaporator 17, the exterior evaporator 17 is disposed at the rear stream sides of the exterior condenser 10 and the radiator 20, and thus, water droplets such as raindrops, muddy water, or splashes flying from the front side of the vehicle are blocked by the exterior condenser 10 and the radiator 20 and are prevented from being directly attached to the exterior evaporator 17, and frost is not easily formed on the exterior evaporator 17, and exhaust heat from the motor, the inverter, the battery, or the like radiated from the radiator 20 is absorbed by the exterior evaporator 17 and is effectively used for heating.

Moreover, the exterior condenser 10, the exterior evaporator 17, and the radiator 20 are disposed so as to be integrally modularized along with the fan 19. However, when the modularization is performed, except that the exterior condenser 10, the exterior evaporator 17, the radiator 20, and the fan 19 are modularized so as to be sequentially disposed in the ventilation direction, as shown in FIG. 3, the exterior condenser 10 and the radiator 20 are vertically disposed, and the exterior evaporator 17 may be disposed at the rear stream sides of the exterior condenser and the radiator. Accordingly, the size in the ventilation direction is decreased, the size of the module is decreased, the cost is decreased, a degree of freedom in the design is increased, and thus, mountability to the vehicle can be improved.

Moreover, as the on-off valve function attached first decompression means 12 and the on-off valve function attached second decompression means 16, an electromagnetic valve attached temperature type automatic expansion valve 30 can be used as shown in FIG. 2.

The electromagnetic valve attached temperature type automatic expansion valve 30 is disposed at the refrigerant inlet sides of the interior evaporator 7 and the exterior evaporator 17, and a temperature type automatic expansion valve 32, which includes a valve main body 33 including an inlet side refrigerant channel 34 and an outlet side refrigerant channel 35 with respect to the evaporator, an electromagnetic valve 31 opening and closing the inlet side refrigerant channel 34 provided in the valve main body 33, and a ball valve 37 which seats on a valve seat portion 36 provided on the inlet side refrigerant channel 34 and adjusts the opening degree, is integrated.

The electromagnetic valve 31 includes an electromagnetic coil 31A, a movable iron core 31B, and a valve body 31C which is provided on a tip of the movable iron core 31B and opens and closes the inlet side channel 34, the movable iron core 31B is moved forward and backward in an axial direction by energization to the electromagnetic coil 31A, and the valve body 31C opens and closes the inlet side channel 34. The temperature type automatic expansion valve 32 detects temperature and pressure of the refrigerant in the outlet side refrigerant channel 35 through which the refrigerant evaporated by the interior evaporator 7 and the exterior evaporator 17 is circulated via a temperature sensitive cylinder and a diaphragm 38, a shaft 39 is moved forward and backward by the differential pressure, and the opening degree is adjusted by pressing the ball valve 37 biased by a spring 40. Moreover, in the electromagnetic valve 31 and the temperature type automatic expansion valve 32, for a decrease in the cost, independently individual standard electromagnetic valve and temperature type automatic expansion valve may be connected to each other in series.

When an operation using one or both of the interior evaporator 7 and the exterior evaporator 17 is performed using the electromagnetic valve attached temperature type automatic expansion valve 30, a refrigerant flow rate can be automatically controlled by the temperature type automatic expansion valve 32 so that a superheating degree of the refrigerant of each evaporator outlet is constant by closing the electromagnetic valve 31 and supplying the refrigerant, which is insulated and expanded by the temperature type automatic expansion valve 32 via the inlet side channel 34, to the interior evaporator 7 and the exterior evaporator 17. Accordingly, compared to a system which uses an electromagnetic expansion valve requiring refrigerant pressure detection means and refrigerant temperature detection means, the configuration is simple and the cost can be decreased. However, in the present invention, as the on-off valve function attached first decompression means 12 and the on-off valve function attached second decompression means 16, instead of the electromagnetic valve attached temperature type automatic expansion valve 30, an electromagnetic expansion valve may be used.

Moreover, the receiver 11 is configured of a check valve attached receiver 11 in which check valves 21 and 22 are integrally incorporated to two refrigerant inflow ports to which the refrigerant pipe 13C is connected from the interior condenser 8 and to which the refrigerant pipe 13 is connected from the exterior condenser 10.

In the heat pump cycle 3, as shown in solid line arrows, during the cooling, the refrigerant, which is compressed by the electric compressor 9 and discharged, circulates through the three-way switching valve 15, the exterior condenser 10, the receiver 11, the first decompression means 12, and the interior evaporator 7 in this order, and circulates through the cooling refrigeration cycle (cooling circuit) 14 which is returned to the electric compressor 9 again. Meanwhile, as shown in dashed line arrows, during the heating, the refrigerant discharged from the electric compressor 9 circulates through the three-way switching valve 15, the interior condenser 8, the receiver 11, the second decompression means 16, and the exterior evaporator 17 in this order, and circulates through the heating heat pump cycle (heating circuit) 18 which is returned to the electric compressor 9 again.

Here, if the heating operation is continued under a frost formation condition at which the outside air temperature is low, frost is formed on the exterior evaporator 17, the frost grows, and thus, the exterior evaporator 17 is frozen thoroughly, since heat exchange with the outside air is inhibited, a heating impossible condition occurs. However, even when the frost is formed on the exterior evaporator 17, it is possible to stably continue the heating operation by slowing the growth of the frost. Accordingly, in the present embodiment, in order to slow the progression of the frost formation, the following configurations are adopted.

Figure 5:
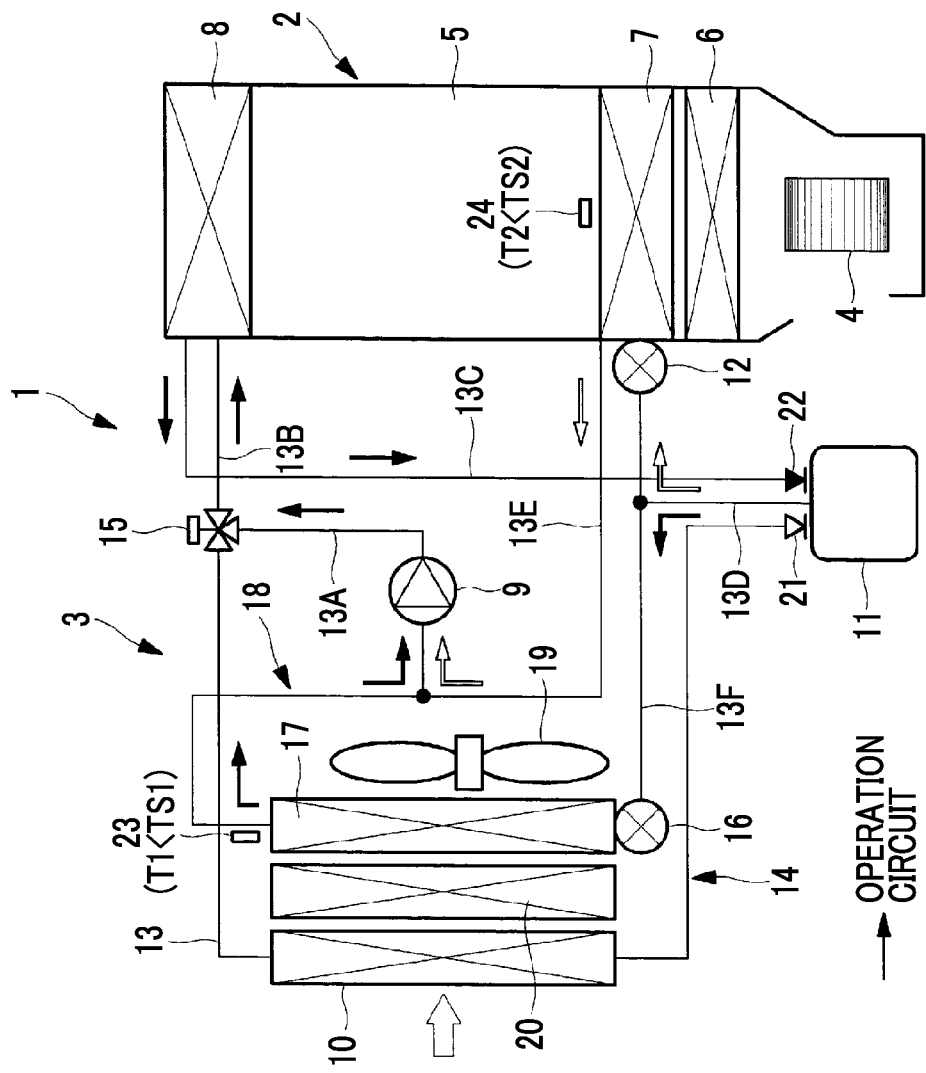
FIG. 5 is a state explanation diagram during a heating operation of the vehicle heat pump air-conditioning system shown in FIG. 1.
Figure 6:
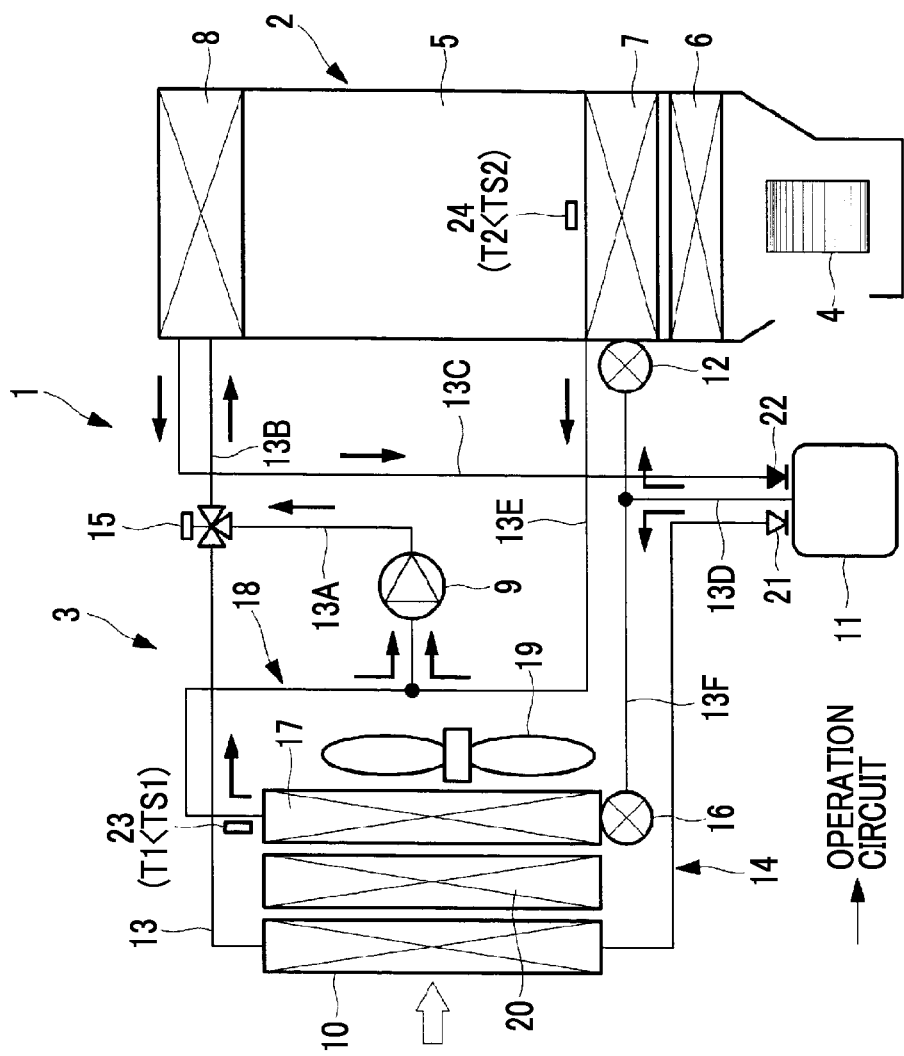
FIG. 6 is an explanatory diagram of a state where an interior evaporator is simultaneously used during the heating operation of the vehicle heat pump air-conditioning system shown in FIG. 1.

In FIG. 5, an operation circuit during the heating operation is shown by solid line arrows. A temperature sensor 23 detecting the refrigerant temperature is provided in the refrigerant outlet pipe of the exterior evaporator 17, and during the heating operation, when a refrigerant temperature T1 detected by the temperature sensor 23 is less than or equal to a set value TS1, as shown in FIG. 6, the on-off function (the electromagnetic valve 31 of the electromagnetic valve attached temperature type automatic expansion valve 30) of the first decompression means 12 is opened, a portion of the circulated refrigerant flows to the interior evaporator 7 side via the first decompression means 12, and thus, the operation is performed so as to simultaneously use the exterior evaporator 17 and the interior evaporator 7. Accordingly, heat absorbing capability of the exterior evaporator 17 is decreased, and thus, progression of the frost formation on the exterior evaporator 17 can be suppressed.

At this time, the temperature of the air, which heated by the interior condenser 8 according to the operation of the interior evaporator 7 and is blown to the vehicle interior, is decreased. When a detection temperature T2 of a temperature sensor 24 detecting the blowout air from the interior evaporator 7 or a fin temperature is less than or equal to the set value TS2, the on-off valve function (the electromagnetic valve 31 of the electromagnetic valve attached temperature type automatic expansion valve 30) of the first decompression means 12 is closed, and thus, it is possible to stably continue the heating operation while suppressing a temperature variation width within a constant range by repeating the closing of the on-off valve function.

Figure 4:
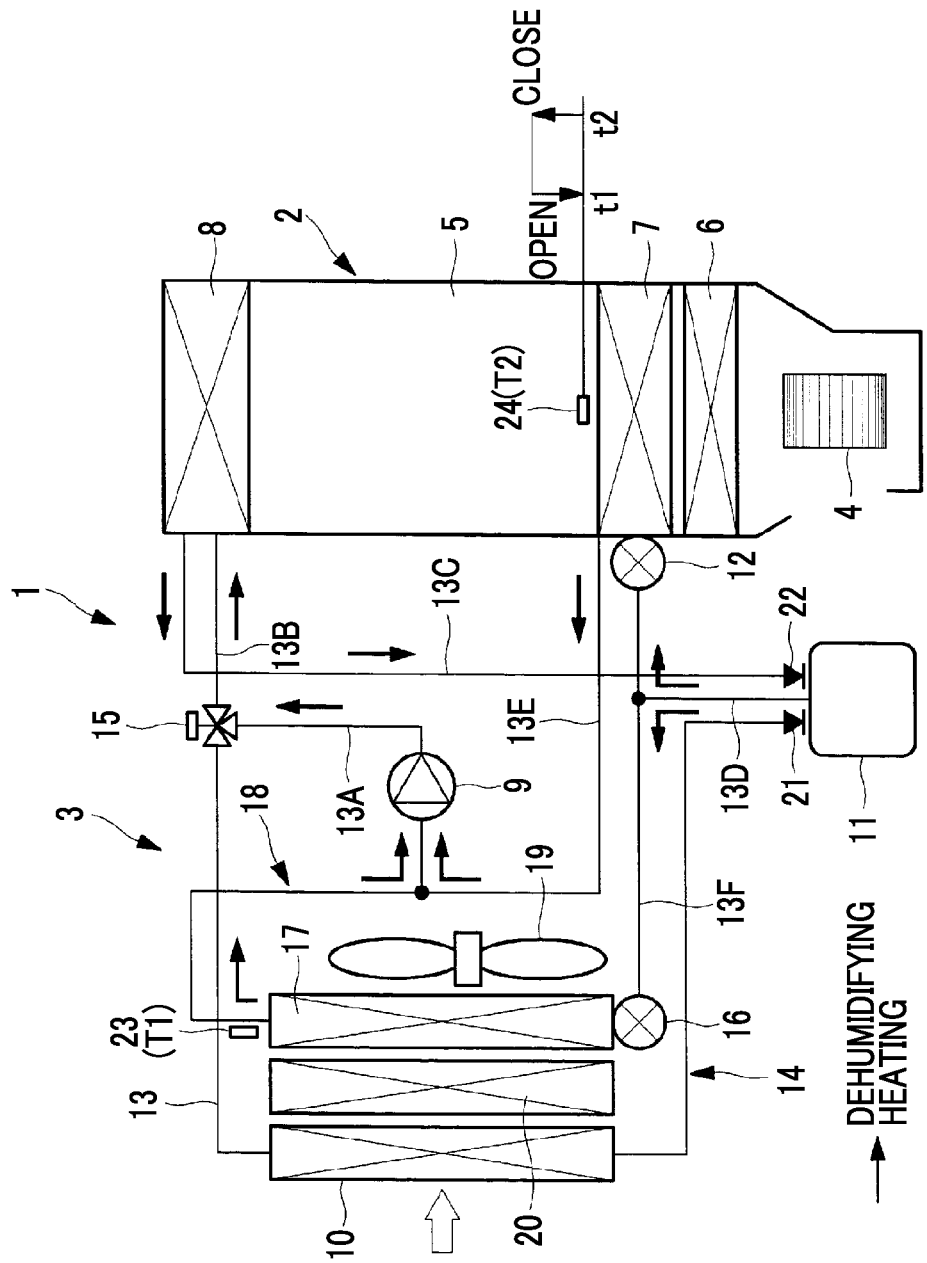
FIG. 4 is a state explanation diagram during a dehumidifying heating operation of the vehicle heat pump air-conditioning system shown in FIG. 1.

Moreover, in the present embodiment, the dehumidifying heating operation can be performed while simultaneously using the interior condenser 8 and the interior evaporator 7. That is, as shown in FIG. 4, the refrigerant circuit is set to the heating heat pump cycle (heating cycle) 18, and as shown in solid line arrows, the refrigerant discharged from the electric compressor 9 sequentially circulates through the three-way switching valve 15, the interior condenser 8, the receiver 11, the second decompression means 16, and the exterior evaporator 17, and circulates through the heat pump cycle (heating circuit) 18 which is returned to electric compressor 9. Simultaneously, the on-off valve function of the first decompression means 12 is closed, and a portion of the refrigerant circulates through the interior evaporator 7 via the first decompression means 12.

Accordingly, the air which is cooled and dehumidified by the interior evaporator 7 is heated by the interior condenser 8, can be blown to the vehicle interior, and thus, can be dehumidified and heated. In this case, since the interior condenser 8 and the interior evaporator 7 are simultaneously functioned, even when the revolution speed of the electric compressor 9 is changed and a circulation flow rate of the refrigerant is increased and decreased, the temperature of the air, which passes through the interior condenser 8 and is blown to the vehicle interior, is changed to follow the change of the set temperature, that is, a temperature linearity characteristic cannot be secured. This is because when the revolution speed of the electric compressor 9 is increased and decreased and the temperature of the air passing through the interior evaporator 7 is decreased, the temperature of the air passing through the interior condenser 8 is increased, the blowout air is mixed with the air passing through the interior condenser, and the temperature of the blowout air becomes an intermediate temperature.

Accordingly, in order to secure the temperature linearity characteristic during the dehumidifying heating, as shown in FIG. 4, when the refrigerant flows to the exterior evaporator 17 and the interior evaporator 7, the interior evaporator 7 and the exterior evaporator 17 are operated so as to be simultaneously used, and the detection temperature T2 of the temperature sensor 24 detecting the air blown from the interior evaporator 7 or the fin temperature is less than or equal to the set temperature t1, the on-off valve function of the first decompression means 12 is closed, and when the air temperature or the fin temperature is equal to or more than the set temperature t2, the on-off valve function of the first decompression means 12 is closed, and thus, the cooling amount of the interior evaporator 7 is adjusted. Accordingly, the blowout air temperature is changed according to the adjustment of the refrigerant circulation flow rate by changing the revolution speed of the electric compressor 9, and thus, the temperature linearity characteristic can be secured.

According to the configuration described above, the following effects are exerted in the present embodiment.

During the cooling, the refrigerant compressed by the electric compressor 9 is introduced to the exterior condenser 10 via the three-way switching valve 17 by the discharge pipe 13A, is heat-exchanged with the outside air ventilated by the fan 19, and is condensed and liquefied. After the liquefied refrigerant is introduced into the receiver 11 via the check valve 21 and is temporarily stored, the liquefied refrigerant is introduced to the first decompression means 12 by the refrigerant pipe 13D, is insulated and expanded so as to be a gas-liquid two-phase state, and is supplied to the interior evaporator 7.

The refrigerant, which is heat-exchanged with the inside air or the outside air sent from the blower 4 by the interior evaporator 7 and is evaporated, is suctioned to the electric compressor 9 via the suction pipe 13E and is compressed again. Hereafter, the same cycle is repeated. Any of the cooling cycles are not changed compared to the cooling cycle of the current system used in the engine drive type vehicle, and can be used in common as it is. The inside air or the outside air, which is cooled by the heat exchange with the refrigerant in the process in which the air passing through the interior evaporator 7, is blown to the vehicle interior, and thus, cools the vehicle interior.

On the other hand, as shown in FIG. 5, during heating, the refrigerant compressed by the electric compressor 9 is introduced to the interior condenser 8 via the three-way switching valve 17 and the refrigerant pipe 13B by the discharge pipe 13A, and is heat-exchanged with the inside air or the outside air sent from the blower 4. The air heated by the heat exchanging is blown to the vehicle interior and heats the vehicle interior. After the refrigerant, which is radiated by the interior condenser 8 and is condensed and liquefied, is introduced to the receiver 11 via the refrigerant pipe 13C and the check valve 22 and is temporarily stored, the refrigerant is introduced to the second decompression means 16 by the refrigerant pipes 13D and 13F, becomes a gas-liquid two-phase state so as to be insulated and expanded, and is supplied to the exterior evaporator 17.

After the refrigerant is heat-exchanged with the outside air ventilated by the fan 19 at the exterior evaporator 17, absorbs heat from the outside air, and is evaporated so as to be gasified, the refrigerant is suctioned to the electric compressor 9 via the suction pipe 13E and is compressed again. Hereinafter, the same cycle is repeated, the heat pump heating can be performed with the outside air as the heat source via the heat pump cycle (heating circuit) 18. During the heating operation, the exterior evaporator 17 is frosted under the outside air condition. In the present embodiment, if the frost is formed on the exterior evaporator 17 and the detection temperature T1 of the temperature sensor 23 provided in the refrigerant outlet pipe of the exterior evaporator 17 is less than or equal to the set value TS1, the on-off valve function of the first decompression means 12 is opened, and as shown in FIG. 6, a portion of the refrigerant is introduced to the interior evaporator 7 via the first decompression means 12.

Accordingly, an interior evaporator assist operation, in which the exterior evaporator 17 and the interior evaporator 7 are simultaneously used, is performed, the heat absorbing capability in the exterior evaporator 17 is decreased, and thus, the progression of the frost formation on the exterior evaporator 17 is suppressed. Moreover, during this, the air passing through the interior evaporator 7 is cooled by the heat absorption operation of the interior evaporator 7, and thus, the temperature of the air, which is heated by the interior condenser 8 and is blown to the vehicle interior, is decreased. If the blowout air from the interior evaporator 7 or the fin temperature T2 detected by the temperature sensor 24 is less than or equal to the set temperature TS2, the on-off valve function of the first decompression means 12 is closed (the electromagnetic valve 31 of the electromagnetic valve attached temperature type automatic expansion valve 30 is closed), and thus, the refrigerant circulation with respect to the interior evaporator 7 is stopped. According to the repetition of this, the variation width in the temperature of the air blown to the vehicle interior is suppressed to a predetermined range, and thus, an occupant does not receive an uncomfortable feeling.

In this way, according to the present embodiment, during the heating, when the outlet refrigerant temperature of the exterior evaporator 17 is less than or equal to the set value under the frost formation condition with respect to the exterior evaporator 17, a portion of the refrigerant is divided and flows to the interior evaporator 7 via the first decompression means 12, the exterior evaporator 17 and the interior evaporator 7 are simultaneously used, the heating operation is performed, and thus, the progression of the frost formation on the exterior evaporator 17 can be slowed. Moreover, when the temperature of the blowout air from the interior evaporator 7 or the fin temperature is less than or equal to the set value, the divided flow of the refrigerant to the interior evaporator 7 via the first decompression means 12 stops, a decrease in the blowout air temperature to the vehicle interior is suppressed, and thus, the operation can be performed so that the variation width of the temperature is suppressed within a predetermined range. Accordingly, during the heating, the progression of the frost formation on the exterior evaporator 17 is slowed, and it is possible to stably continue the heating operation while suppressing the variation of the blowout air temperature.

In addition, during the dehumidifying heating operation, that is, when the dehumidifying heating is performed in which the interior condenser 8 and the interior evaporator 7 are simultaneously used, the air, which passes through the interior evaporator 7 and is cooled and dehumidified, is heated by the interior condenser 8 and is blown to the vehicle interior, as shown in FIG. 4, the on-off valve functions of the second decompression means 16 and the first decompression means 12 are opened, the refrigerant flows to both of the exterior evaporator 17 and the interior evaporator 7, and thus, the operation is performed so as to simultaneously use the interior evaporator 7 and the exterior evaporator 17. During this, when the detection temperature T2 of the temperature sensor 24 detecting the temperature of the air blown from the interior evaporator 7 or the fin temperature is less than or equal to the set temperature t1, the on-off valve function of the first decompression means 12 is closed, and when the detection temperature T2 is equal to or more than the set temperature t2, the on-off valve function of the first decompression means 12 is closed, and thus, the cooling amount of the interior evaporator 7 is adjusted.

Accordingly, during the dehumidifying heating, the blowout air temperature is changed by the adjustment of the refrigerant circulation flow rate according to the change of the revolution speed of the electric compressor 9, and the temperature linearity characteristic can be secured.

In this way, according to the present embodiment, even when the interior condenser 8 and the interior evaporator 7 are simultaneously used and the dehumidifying heating operation is performed, the temperature linearity characteristic can be secured, and heating performance in the heat pump type vehicle air conditioning system can be improved.

In addition, the exterior evaporator 17 is disposed so as to be parallel with the exterior condenser 10 and the radiator 20 at the rear stream sides of the exterior condenser 10 and the radiator 20 in the ventilation path of the fan 19 ventilating the outside air to the exterior condenser 10 and the radiator 20, and during the heating and the dehumidifying heating, the heat pump heating is performed by the heat absorption from the outside air ventilated via the fan 19. Accordingly, the fan 19 is used in common, the number of parts can be suppressed, and the configuration of the vehicle heat pump air-conditioning system 1 can be simplified and compact, and the cost thereof can be decreased. In addition, since the exterior evaporator 17 is disposed at the rear stream sides of the exterior condenser 10 and the radiator 20, during the heating and the dehumidifying heating operation, the frost formation with respect to the exterior evaporator 17 does not easily occur, the exhaust heat radiated from the radiator 20 is effectively used, and thus, heating capability can be improved.

At this time, as shown in FIG. 3, when the exterior condenser 10 and the radiator 20 are vertically disposed, the exterior evaporator 17 is disposed at the rear stream sides of the exterior condenser 10 and the radiator 20, and thus, the interior condenser 8, the exterior evaporator 17, the radiator 20, and the fan 19 are modularized so as to be integrated, compared to the configuration in which the interior condenser 8, the exterior evaporator 17, the radiator 20, and the fan 19 are sequentially disposed in the ventilation direction so as to be modularized, the size in the ventilation direction is decreased, the size of the module can be decreased, the cost can be decreased, a degree of freedom in the design is increased, and mountability to the vehicle can be improved.

In addition, the receiver 11 is a check valve attached receiver in which the check valves 21 and 22 are integrally incorporated to two refrigerant inflow ports. Accordingly, the cooling refrigerant cycle 14 or the heating heat pump cycle 18, which is not used by an operation mode, can be blocked by the check valves 21 and 22 incorporated to two refrigerant inflow ports of the receiver 11. Therefore, compared to a system in which the receiver 11 and the check valves 21 and 22 are provided in the refrigerant circuit individually, a connection part such as a flange is not required, the refrigerant circuit can be simplified, and the cost can be decreased.

In addition, in the present embodiment, each of the first on-off valve function attached decompression means 12 and the second on-off valve function attached decompression means 16 is configured of the electromagnetic valve attached temperature type automatic expansion valve 30. Therefore, an automatic control can be performed so that the superheating degree at the evaporator outlet of the refrigerant evaporated so as to be gasified by the interior evaporator 7 during the cooling and by the exterior evaporator 17 during the heating is constant. Accordingly, compared to a case where the electromagnetic expansion valve requiring the refrigerant pressure detection means and the refrigerant temperature detection means is used, the control system can be simplified, the cost can be decreased, and reliability can be improved. Moreover, the electromagnetic valve attached temperature type automatic expansion valve 30, in which the electromagnetic valve 31 and the temperature type automatic expansion valve 32 are integrated, is used, and thus, connection parts can be decreased, assembly man-hours can be decreased, and thus, the cost can be decreased.

In addition, since the refrigerant circuit which is not used according to the operation mode can be closed by closing the on-off valve functions of the first and second decompression means 12 and 16, the stopped circuit is fully closed securely, and collection or the like of the refrigerant can be prevented. Moreover, instead of the above-described integrated electromagnetic valve attached temperature type automatic expansion valve 30, the first on-off valve function attached decompression means 12 and the second on-off valve function attached decompression means 16 may be replaced by a configuration in which a standard separate electromagnetic valve and a standard separate temperature type automatic expansion valve, which are independent to each other, are connected to each other in series. In this case, each standard product can be used, and thus, the cost may be decreased.

In addition, in the present invention, as the first on-off valve function attached decompression means 12 and the second on-off valve function attached decompression means 16, instead of the electromagnetic valve attached temperature type automatic expansion valve 30, the first and second decompression means 12 and 16 may be replaced by an electromagnetic expansion valve which has fully closed and fully opened functions.

Moreover, in the present embodiment, the electric auxiliary heater 6 configured of a PTC heater or the like is installed in the HVAC unit 2. Accordingly, under a condition in which heating capability is likely to be insufficient, such as when the outer air temperature is low, when the heating starts, or when a window is clouded, the electric auxiliary heater 6 is temporarily operated concurrently with the heat pump heating operation, and thus, the blowout air temperature is increased, and insufficiency of the heating capability can be complemented. Therefore, necessary maximum heating capability can be increased, and compared to a system in which the electric heater performs the heating operation as a main heat source, an usage rate of the electric auxiliary heater 6 is decreased, a high efficiency operation can be performed, and a decrease or the like in a vehicle travel distance due to an increase of the heating power consumption can be suppressed. However, the electric auxiliary heater 6 may be omitted.

Moreover, the present invention is not limited to the above-described embodiment and can be appropriately modified within a scope which does not depart from the gist. For example, in the embodiment, the three-way switching valve 15 is used as the switching means of the refrigerant. However, the three-way switching valve may be replaced by two electromagnetic valves or a four-way switching valve.

REFERENCE SIGNS LIST

1: vehicle heat pump air-conditioning system
2: HVAC unit
3: heat pump cycle
7: interior evaporator
8: interior condenser
9: electric compressor
10: exterior condenser
11: receiver (check valve attached receiver)
12: on-off valve function attached first decompression means
13A: discharge pipe (discharge circuit)
13E: suction pipe (suction circuit)
14: cooling refrigeration cycle (cooling circuit)
15: three-way switching valve (switching means)
16: on-off valve function attached second decompression means 17: exterior evaporator
18: heating heat pump cycle (heating circuit)
19: fan
20: radiator
21, 22: check valve
23: temperature sensor detecting refrigerant temperature
24: temperature sensor detecting blowout air temperature or fin temperature
30: electromagnetic valve attached temperature type automatic expansion valve

The invention claimed is:

1. A vehicle heat pump air-conditioning system comprising:
a cooling refrigeration cycle in which an electric compressor, an exterior condenser, a receiver, a first expansion valve, and an interior evaporator provided in a HVAC unit are connected to one another in this order;
an interior condenser which is disposed at the downstream side of the interior evaporator in the HVAC unit and in which a refrigerant inlet side of the interior condenser is connected to a discharge circuit of the electric compressor via a switching valve and a refrigerant outlet side of the interior condenser is connected to the receiver; and
an exterior evaporator in which a refrigerant inlet side of the exterior evaporator is connected to an outlet side of the receiver via a second expansion valve and a refrigerant outlet side of the exterior evaporator is connected to a suction circuit of the electric compressor,
wherein the electric compressor, the switching valve, the interior condenser, the receiver, the second expansion valve, and the exterior evaporator are connected to one another in this order, and a heating heat pump cycle is configured, and
wherein the exterior condenser, the exterior evaporator, and a radiator mounted on a vehicle side are provided in a ventilation path of a single fan, and the exterior evaporator is disposed at the rear stream sides of the exterior condenser and the radiator in the ventilation path.

2. The vehicle heat pump air-conditioning system according to claim 1,
wherein the first expansion valve and the second expansion valve are an electromagnetic valve attached temperature type automatic expansion valve or an electromagnetic expansion valve.

3. The vehicle heat pump air-conditioning system according to claim 1,
wherein the receiver is a check valve attached receiver in which each check valve is incorporated to a refrigerant inflow port of a refrigerant circuit from the exterior condenser and the interior condenser connected to the receiver.

4. The vehicle heat pump air-conditioning system according to claim 1,
wherein the exterior condenser and the radiator are vertically disposed, and the exterior evaporator is disposed at the rear stream sides of the exterior condenser and the radiator.

5. A vehicle heat pump air-conditioning system comprising:
a cooling refrigeration cycle in which an electric compressor, an exterior condenser, a receiver, a first expansion valve, and an interior evaporator provided in a HVAC unit are connected to one another in this order;
an interior condenser which is disposed at the downstream side of the interior evaporator in the HVAC unit and in which a refrigerant inlet side of the interior condenser is connected to a discharge circuit of the electric compressor via a switching valve and a refrigerant outlet side of the interior condenser is connected to the receiver; and
an exterior evaporator in which a refrigerant inlet side of the exterior evaporator is connected to an outlet side of the receiver via a second expansion valve and a refrigerant outlet side of the exterior evaporator is connected to a suction circuit of the electric compressor,
wherein the electric compressor, the switching valve, the interior condenser, the receiver, the second expansion valve, and the exterior evaporator are connected to one another in this order, and a heating heat pump cycle is configured, and
wherein the first and second expansion valves are configured with on-off valve functions, and
wherein the on-off valve function of the first expansion valve is opened when a predetermined temperature condition is satisfied, and the exterior evaporator and the interior evaporator is simultaneously used during dehumidifying heating and heating;
further comprising:
a first temperature sensor provided in the refrigerant outlet side of the exterior evaporator and configured to detect a refrigerant temperature;
a second temperature sensor configured to detect a blowout air from the interior evaporator or a fin temperature; and
a control system configured to control the on-off valve function of the first expansion valve,
wherein the control system opens, during a heating operation, the on-off valve function of the first expansion valve when the temperature detected by the first temperature sensor is less than or equal to a first set value, and a portion of the refrigerant is divided and flows to the interior evaporator via the first expansion valve, and closes the on-off valve function of the first expansion valve when the temperature detected by the second temperature sensor is less than or equal to a second set value, and the divided flow of the refrigerant to the interior evaporator via the first expansion valve is stopped.

6. A vehicle heat pump air-conditioning system comprising:
a cooling refrigeration cycle in which an electric compressor, an exterior condenser, a receiver, a first expansion valve, and an interior evaporator provided in a HVAC unit are connected to one another in this order;
an interior condenser which is disposed at the downstream side of the interior evaporator in the HVAC unit and in which a refrigerant inlet side of the interior condenser is connected to a discharge circuit of the electric compressor via a switching valve and a refrigerant outlet side of the interior condenser is connected to the receiver; and
an exterior evaporator in which a refrigerant inlet side of the exterior evaporator is connected to an outlet side of the receiver via a second expansion valve and a refrigerant outlet side of the exterior evaporator is connected to a suction circuit of the electric compressor,
wherein the electric compressor, the switching valve, the interior condenser, the receiver, the second expansion valve, and the exterior evaporator are connected to one another in this order, and a heating heat pump cycle is configured, and wherein the first and second expansion valves are configured with on-off valve functions, and wherein the on-off valve function of the first expansion valve is opened when a predetermined temperature condition is satisfied, and the exterior evaporator and the interior evaporator is simultaneously used during dehumidifying heating and heating;

further comprising:

a temperature sensor configured to detect a blowout air from the interior evaporator or a fin temperature; and a control system configured to control the on-off valve function of the first expansion valve, wherein the control system opens, during a dehumidifying heating operation, the on-off valve function of the first expansion valve when the temperature detected by the temperature sensor is equal to or more than a first set value, and a portion of the refrigerant is divided and flows to the interior evaporator via the first expansion valve, and closes the on-off valve function of the first expansion valve when the temperature detected by the temperature sensor is less than or equal to a second set value, and the divided flow of the refrigerant to the interior evaporator via the first expansion valve is stopped.

* * * * *